Figure 1:
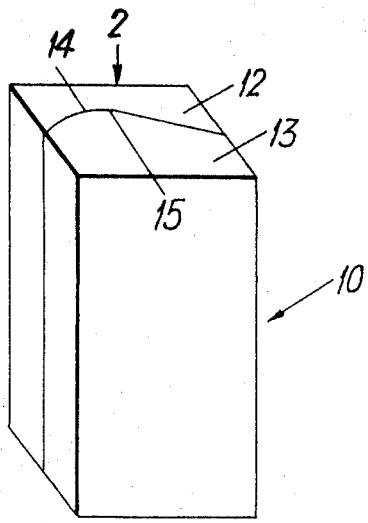

United States Patent
Jones

[15] 3,656,222
[45] Apr. 18, 1972

[54] METHOD OF MAKING AN AEROFOIL-SHAPED BLADE OR BLADE BLANK

[72] Inventor: John Windsor Jones, Thornton-in-Craven, Skipton, England

[73] Assignee: Rolls-Royce Limited, Derby, Derbyshire, England

[22] Filed: Mar. 17, 1969

[21] Appl. No.: 807,586

[30] Foreign Application Priority Data

Mar. 27, 1968 Great Britain......................14,781/68

[52] U.S. Cl. .....................29/156.8 H, 416/213, 29/156.8 B, 29/156.8 T
[51] Int. Cl. ..................B21k 3/04, B23p 15/02, B23p 15/04
[58] Field of Search................29/156.8 H, 156.8 B, 156.8 R, 29/156.8 T; 416/213

[56] References Cited

UNITED STATES PATENTS

| | | |
|---|---|---|
| 2,807,437 | 9/1957 | Roush................................29/156.8 X |
| 2,821,495 | 1/1958 | Dulin................................29/487 X |
| 3,025,596 | 3/1962 | Ward et al. ........................29/501 X |
| 3,083,451 | 4/1963 | Atkinson..............................29/501 X |
| 3,088,192 | 5/1963 | Turner..................................29/156.8 |
| 3,110,102 | 11/1963 | Pfefferkorn..............................29/490 |
| 3,170,234 | 2/1965 | Tarr....................................29/498 X |
| 3,197,858 | 8/1965 | Feduska et al......................29/498 X |
| 3,329,596 | 7/1967 | Abt et al. ..........................29/156.8 X |
| 3,342,971 | 9/1967 | Kaarlela..............................29/487 X |
| 3,349,465 | 10/1967 | La Pan et al.........................29/157.3 |

Primary Examiner—Charlie T. Moon
Assistant Examiner—Donald P. Rooney
Attorney—Cushman, Darby & Cushman

[57] ABSTRACT

A method of making an aerofoil-shaped blade or blade blank comprises forming two blade halves which are assembled together to form the complete blade or blade blank. The surfaces of adjacent blade halves have cooling fluid passages therebetween, and in assembling the blade halves a sheet of brazing material is interposed between the blade halves. The sheet is provided with slots therein which are aligned with and of corresponding shape to the cooling fluid passages.

7 Claims, 4 Drawing Figures

PATENTED APR 18 1972

3,656,222

Inventor
JOHN WINDSOR JONES

By
Cushman, Darby & Cushman
Attorneys

METHOD OF MAKING AN AEROFOIL-SHAPED BLADE OR BLADE BLANK

This invention concerns a method of making an aerofoil-shaped blade (or blade blank) from which an aerofoil-shaped blade is to be formed, such, for example, as a rotor blade of a high pressure turbine rotor of a gas turbine engine.

The object of the invention is to provide an inexpensive and satisfactory method of forming such a blade or blade blank with a cooling air passage or passages.

According to the present invention, there is provided a method of making an aerofoil-shaped blade comprising forming a plurality of blade portions which may be assembled together to form the complete blade, at least one of the surfaces of adjacent portions being formed to provide at least one cooling fluid passage between the portions, assembling the said blade portions together with a sheet of brazing material interposed between the or each adjacent pair of blade portions, at least one slot being provided in said at least one sheet said at least one slot being aligned with, and of corresponding shape to, the respective cooling fluid passage, the brazing material of said at least one sheet being adapted to form a diffusion braze with the material of the blade portions, and heat treating the assembly of blade portions and brazing material so that the blade portions are diffusion brazed to each other.

The or each cooling fluid passage is preferably formed by electroforming (e.g. by spark machining) a groove in at least one of the surfaces of the adjacent blade portions.

The surfaces of adjacent blade portions are preferably formed to prevent relative angular movement therebetween.

The or each said slot may be formed after the respective sheet has been positioned with respect to one of the respective blade portions.

The brazing material preferably comprises a mixture of an alloy and of a synthetic resin material, the synthetic resin material being such as to become vaporized, and thus removed, during the heat treatment.

The heat treatment preferably is a solution heat treatment which includes heating said assembly in vacuo until the brazing material melts.

Prior to the heat treatment, the or each cooling fluid passage may be coated with a coating material which prevents the adhesion of brazing material thereto.

The invention also comprises an aerofoil-shaped blade or blade blank when made by the method set forth above.

Figure 2:
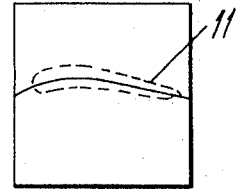
Figure 3:
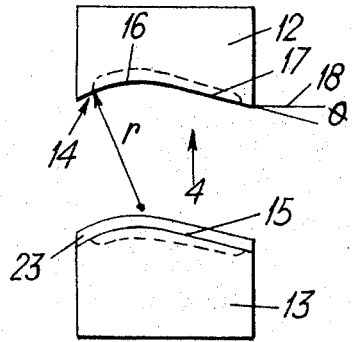
Figure 4:
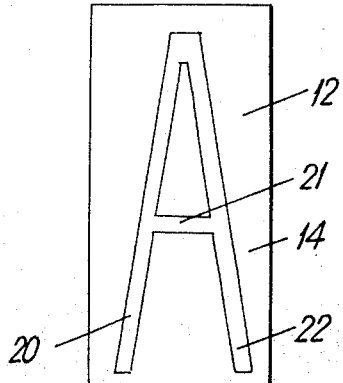

The invention is illustrated, merely by way of example, in the accompanying drawings, in which:

FIG. 1 is a diagrammatic perspective view of a blade blank formed in two portions, FIG. 2 is a diagrammatic plan view of the blank of FIG. 1, looking in the direction of the arrow 2 of FIG. 1, FIG. 3 is a view similar to FIG. 2 but showing the two portions of the blank separated, and FIG. 4 is a diagrammatic view of one of the said portions looking in the direction of the arrow 4 of FIG. 3.

In FIG. 1 there is shown a blade blank 10 from which may be formed an aerofoil-shaped blade 11 which is indicated by dotted lines in FIG. 2, the blade 11, being for example, a turbine rotor blade of a high pressure turbine of a gas turbine engine.

The blade blank 10 is formed of two portions 12, 13 which are respectively provided with adjacent inter-fitting surfaces 14, 15, which are respectively concave and convex.

As indicated in FIG. 3, the surfaces 14, 15, are not truly cylindrical in shape and are thus prevented from having relative angular movement with respect to each other. For example, the surface 14 has a portion 16 which is truly cylindrical and has a radius of curvature r, the portion 16, however, merging smoothly into a flat portion 17 which is tangential thereto. The portion 17 is disposed at an angle $\phi$ (e.g. of 60°) to the normal 18 to the sides of the blade blank 10.

As will be appreciated, the blade portions 12, 13 may, if desired, be formed with a centrally disposed cylindrical portion 16 and with flat tangential portions 17 on each of the opposite sides thereof.

The surfaces 15 is of course correspondingly formed.

As indicated, in FIG. 4, the surface 14 is formed with cooling air grooves 20, 21, 22, and similar cooling air grooves, which are aligned therewith, may, if desired, be provided in the surface 15. The surface 14 and the cooling air grooves 20-22 therein are electro-formed in the respective blade portion, e.g. by spark machining. The electrode employed for such spark machining may, for example, itself be produced by the method disclosed in our co-pending British Pat. application No. 13580/68.

The blade portion 13 may be manufactured from a bar (not shown) by turning the bar and splitting it prior to the formation of the cooling air passages (if any) therein. The blade portion 12 may be forged prior to the said spark machining, and the surface 14 may be finish ground, e.g. by means of electrolytic grinding using a graphite wheel.

The blade portions 12, 13 are then de-greased and are brazed together by assembling them to form the complete blade blank 10, a sheet 23 of brazing material being interposed between the surfaces 14, 15 of the blade portions 12, 13.

The brazing material of the sheet 23 may comprise a mixture of an alloy and of a synthetic resin material, the latter being such as to become vaporized and thus removed during the solution heat treatment referred to below. The brazing material moreover is such as to be compatible with and adapted to form a diffusion braze with the material of the blade portions 12, 13. Thus, if, for example, the blade portions 12, 13 are formed of a nickel based alloy such as Nimonic 105 or Nimonic 118, (Nimonic being a Registered Trade Mark), the brazing material of the sheet 23 may consist of 60 percent by weight of an alloy sold under the Trade Name "NICROBRAZE 4775" and 40 percent by weight of an acrylic resin. For example, the sheet 23 may be produced by forming sintered buttons of the mixture of alloy and acrylic resin, and then forming the sheet 23 by pressing these buttons between heated palates.

Having been so formed, the sheet 23 is attached to the blade portion 13 e.g. by means of a cement sold under the Trade Name TENSOL No. 6 and slots (not shown) are formed in the sheet 23 after it had been so positioned with respect to the blade portion 13, the said slots being of corresponding shape to, and being aligned with, the grooves 20-22. The cutting of the slots may be effected by using a small air turbine drill following the profile of the grooves 20-22.

The blade portions 12, 13, with the sheet 23 therebetween, are then placed together in a jig (not shown). The jig is, however, provided merely in order to locate the blade portions 12, 13 with respect to each other, no gripping or positive pressure being applied to urge the blade portions 12, 13 together. Thus in the solution heat treatment referred to below, during which the blade portion 12 will be disposed above the blade portion 13, no force is employed to effect such urging other than that of gravity, whereby there will be little tendency for the brazing material to be squeezed out of position.

The solution heat treatment comprises placing the assembly in an oven which is maintained at an elevated temperature until the brazing material melts. The solution heat treatment is effected in vacuo, the heating and vacuum conditions effecting removal of the acrylic binder of the sheet 23, with the result that the blade portion 12 moves under gravity towards the blade portion 13.

Thus, for example, if the blade portions 12, 13 are formed of Nimonic 105 the assembly of the blade portions 12, 13 and sheet 23 is given a solution heat treatment for 4 hours at 1,150° C, and then a further treatment of 16 hours at 1050° C, while if the blade portions 12, 13 are formed of Nimonic 118, the solution treatment is for 1½ hours at 1,190° C, the assembly is allowed to cool from the temperature of 1,190° C, to 1,000° C, and is thereafter rapidly cooled to room temperature.

Prior to the said solution heat treatment, each of the grooves 20, 22 may be coated with a coating material which prevents the adhesion of brazing material thereto. Thus the coating material may for example be constituted by a thin film of the material sold under the Trade Name NICROBRAZE GREEN Stop-off paint which is basically a suspension of chromic oxide in an organic carrier. During brazing, this paint becomes charred so as to give a black dust over which the brazing alloy will not flow.

At the end of the heat treatment the assembly of portions 12, 13 will have become diffusion brazed to each other. A two-part blade blank is thus formed, the joint between which, at the blade operating temperature, is as strong as that of the parent metal so that there is no danger of the joint melting at a relatively low temperature. From this blade blank the finished blade 11 may thereafter be formed by any suitable method.

I claim:

1. In a method of making an aerofoil-shaped blade comprising forming a plurality of blade portions which may be assembled together to form the complete blade, at least one of the surfaces of adjacent portions being formed to provide at least one cooling fluid passage between the portions assembling the said blade portions together with a sheet of brazing material interposed between the or each adjacent pair of blade portions, at least one slot being provided in said at least one sheet, said at least one slot being aligned with, and of corresponding shape to, the respective cooling fluid passage, the brazing material of said at least one sheet being adapted to form a diffusion braze with the material of the blade portions, and subjecting the assembly of blade portions and brazing material to elevated temperatures by first brazing the blade portions to each other and thereafter heat treating the assembly, the improvement wherein said brazing and solution heat treatment are carried out in one continuous operation such that at the end of the treatment at elevated temperatures the blade portions become diffusion brazed to each other and the joint between the two blade portions is as strong as the parent metal, thereby avoiding a joint melting at a relatively low temperature.

2. A method as claimed in claim 1 in which said at least one cooling fluid passage is formed by electroforming a groove in at least one of the surfaces of the adjacent blade portions.

3. A method as claimed in claim 1 in which the surfaces of adjacent blade portions are formed to prevent relative angular movement therebetween.

4. A method as claimed in claim 1 in which said at least one slot is formed after the respective sheet has been positioned with respect to one of the respective blade portions.

5. A method as claimed in claim 1 in which the brazing material comprises a mixture of an alloy and of a synthetic resin material, the synthetic resin material being such as to become vaporised, and thus removed, during the heat treatment.

6. A method as claimed in claim 1 in which the heat treatment is a solution heat treatment which includes heating said assembly in vacuo until the brazing material melts.

7. A method as claimed in claim 1 in which, prior to the heat treatment, the or each cooling fluid passage is coated with a coating material which prevents the adhesion of brazing material thereto.

* * * * *